L. E. BAER.
BELT FASTENER.
APPLICATION FILED AUG. 12, 1920.
1,366,551.
Patented Jan. 25, 1921.
2 SHEETS—SHEET 2.
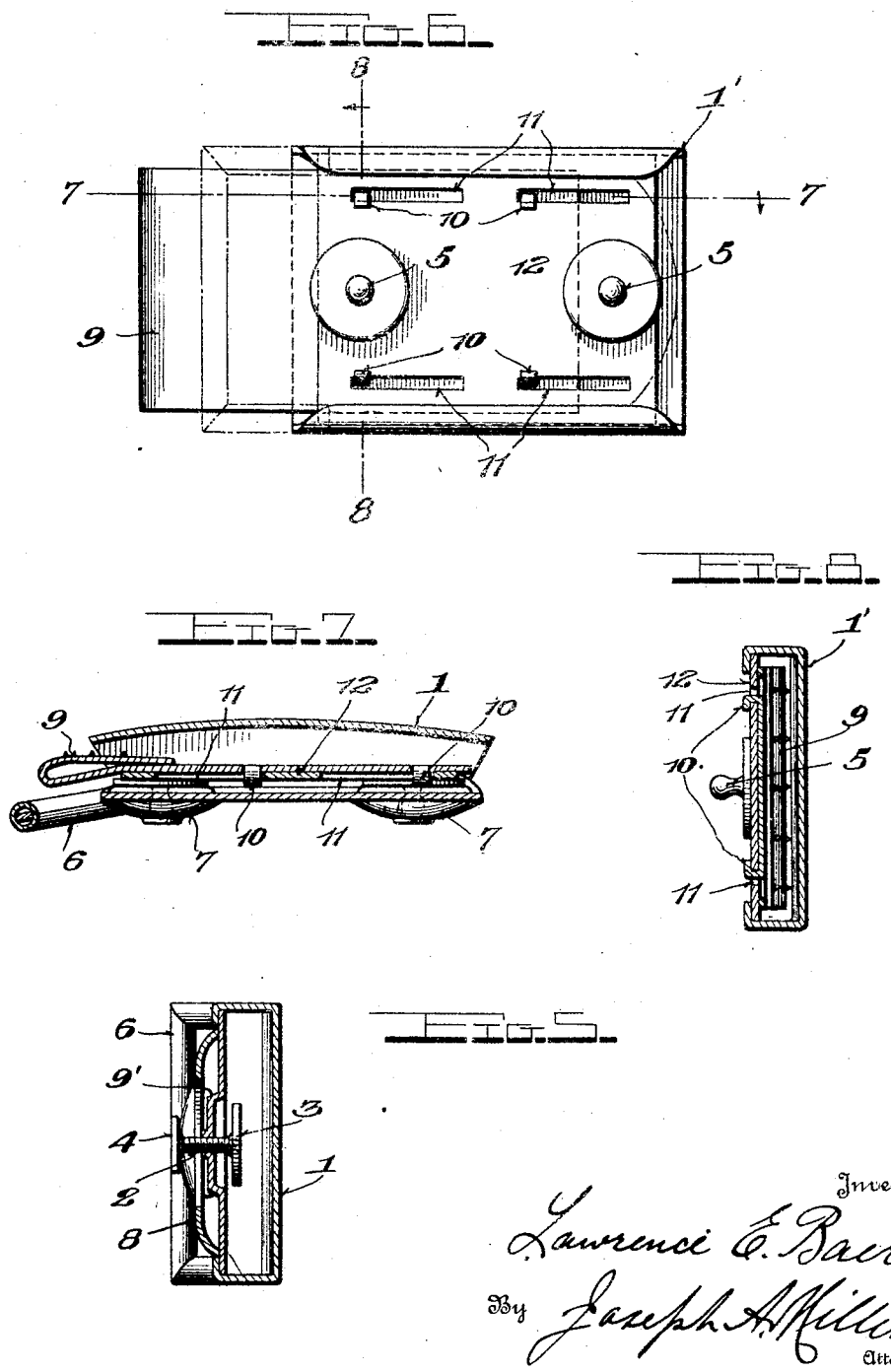

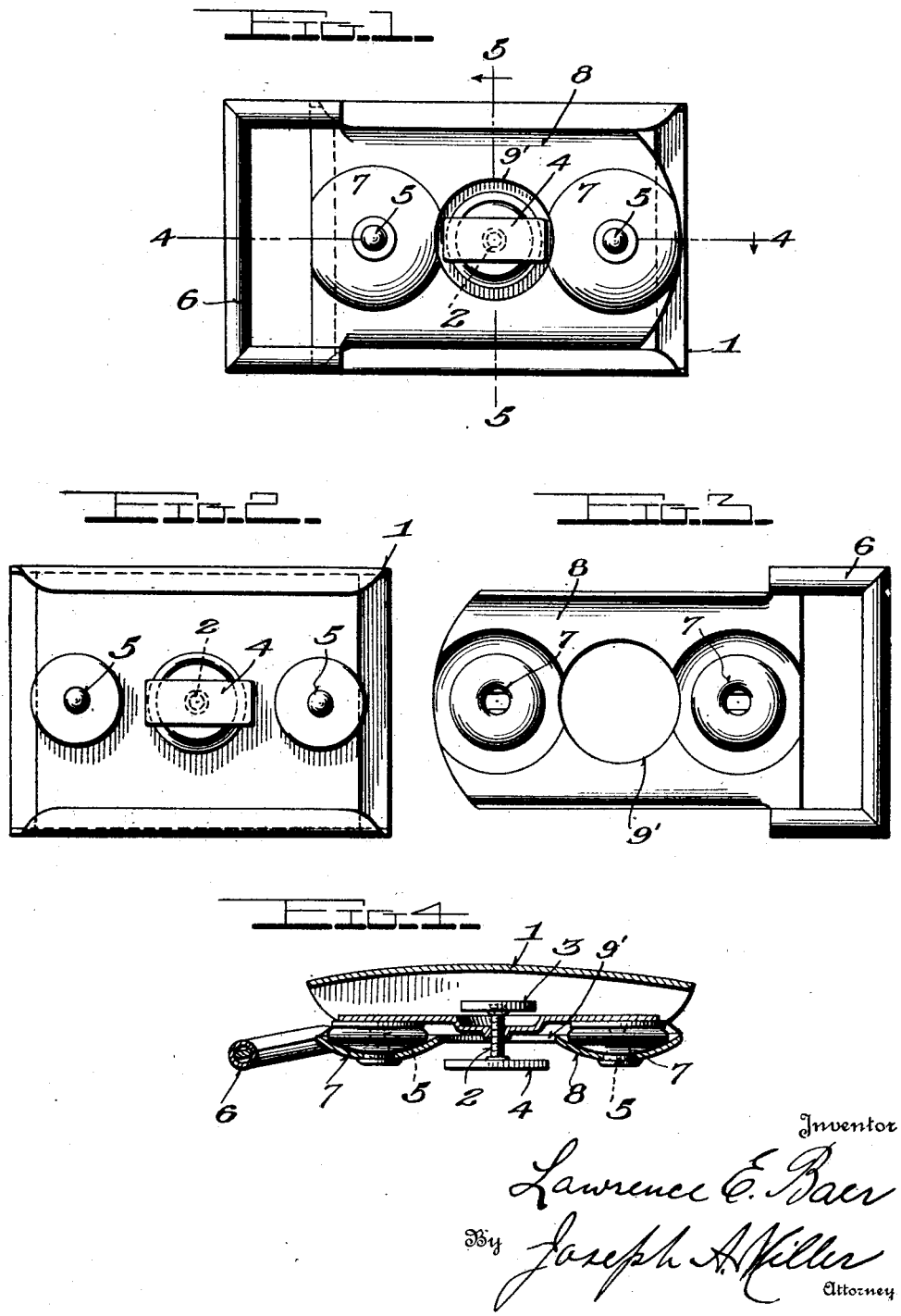

UNITED STATES PATENT OFFICE.

LAWRENCE E. BAER, OF ATTLEBORO, MASSACHUSETTS, ASSIGNOR TO THE BAER & WILDE COMPANY, OF ATTLEBORO, MASSACHUSETTS, A CORPORATION.

BELT-FASTENER.

1,366,551.  Specification of Letters Patent.  Patented Jan. 25, 1921.

Application filed August 12, 1920. Serial No. 403,027.

*To all whom it may concern:*

Be it known that I, LAWRENCE E. BAER, a citizen of the United States, residing at Attleboro, in the county of Bristol and State of Massachusetts, have invented new and useful Improvements in Belt-Fasteners, of which the following is a specification.

This invention relates to certain new and useful improvements in belt fasteners, and the primary object thereof is to provide means for fastening the ends of a belt so that the belt need not be adjusted each time when placed in position, as to its diameter. In other words the invention aims to provide a fastener which consists of two parts, the parts being separable and each attached in a fixed position to the respective belt ends, so that when the belt is placed in position and the parts are fastened together, the belt is always possessed of the same predetermined diameter.

A further object of the invention is to provide a fastener in which one of the parts is adjustable and after adjustment can be rigidly or fixedly secured, so as to retain the adjustment for as long a period as desired.

The invention further aims to provide a device in which the belt ends can be easily and quickly separated and secured together, and to still further provide an adjusting device which can be easily and quickly operated.

Still further and other objects will be later set forth and manifested in the course of the following description.

In the drawings:

Figure 1, is a rear elevation of the invention showing the parts connected;

Fig. 2, is a similar view of the front member;

Fig. 3, is a similar view of the back member or plate;

Fig. 4, is a section on line 4—4 of Fig. 1;

Fig. 5, is a section on line 5—5 of Fig. 1;

Fig. 6 is a rear elevation of a modified form of front member;

Fig. 7, is a section on line 7—7 of Fig. 6; and

Fig. 8, is a section on line 8—8 of Fig. 6.

In proceeding in accordance with the present invention a hollow member 1 is employed which is formed to have a substantially rectangular cross section and on the interior of which one end of the belt is received and held rigidly in place by a screw clamp consisting of a shank 2, a head 3 and a finger piece 4, the shank being threaded through the rear wall of the front member as depicted. On opposite sides of the screw clamp a pair of male members 5 of a common form of snap or so called glove fastener are secured. The outer end of the belt is passed through and rigidly secured through a loop 6 secured to one end of the rear member of the fastener, this rear member being composed of a plate 8 having female members 7 secured to its underface to receive the male members 5. The plate 8 is formed with a central hole 9' to receive finger pieces 4 of the screw clamp. From the foregoing it will be seen that the belt is originally supplied with the plate 8 rigidly secured thereto at one end. The user then adjusts the belt about his waist and passes the other end through the hollow front member 1, and when the adjustment desired has been made he then operates the screw clamp so as to fixedly secure the last named end of the belt to the front member. The device therefore does not require any further adjustment of the belt, since when the latter is removed the members 1 and 8 are separated or disengaged, and when replaced the members are again related in their original relation by snapping of the socket fastening into engagement with each other. It will therefore be seen that adjustment of the belt diameter is not required after the latter has been initially determined.

In the modified form of the invention shown in Figs. 6–8, the structure is identical with that in the preferred form excepting as to the screw clamp, which latter is eliminated and in its place a wedge 9 is employed which has lugs 10 engaging in slots 11 formed in the back plate 12 of the front member 1'. Obviously in this form the hole 9' of the plate is dispensed with. In this form of the invention it will be seen that the wedge after initial setting will operate the same as the screw clamp in the preferred form.

In both forms it will be apparent that the belt when placed in position will always be possessed of the same diameter, so that the familiar holes in the belt are not only dispensed with, but in addition the user at all times is assured that the belt will be properly adjusted after the initial adjustment has been obtained.

Having thus described my invention, what I claim as new and desire to secure by Letters Patent is:—

1. In a belt fastener for personal wear, a front member, means to secure one end of a belt thereto, a rear member, means to secure the opposite end of the belt thereto, one of said means being formed to rigidly and adjustably secure the belt end at a predetermined point so as to maintain the adjustment of the belt diameter for as long a period as desired, and means to connect said members together at a plurality of points so as to rigidly and removably connect the two members against relative movement, said last named means being independent of both of the belt end securing means.

2. In a belt fastener, a front member having means for fixedly securing one end of the belt thereto, a rear member having the other end of the belt fixedly secured thereto, and snap fasteners between said members for removably connecting same operating independent of the belt ends.

3. In a belt fastener, a hollow front member formed to receive one end of the belt therein, means for adjustably and fixedly securing said end of the belt to the member, a pair of male members borne by the end parts of the back of said front member, a plate having a pair of female members formed for snapping engagement with the male members, and means for fixedly securing the opposite end of the belt to said plate, said male and female members operating independent of each of the belt ends and their securing means.

4. In a belt fastener, a hollow front member formed to receive one end of the belt therein, a screw clamp borne by said member to adjustably and fixedly secure said belt end in position, a back plate having an opening through which the outer end of the screw clamp projects, means to secure the opposite end of the belt to one end of the plate, and snap fasteners between the plate and front member arranged at opposite sides of the screw clamp.

5. A belt fastener composed of two substantially similar and complementary members, means for permanently affixing one end of the belt to one member, means for adjustably affixing the other end of the belt to the other member, and snap fasteners for removably securing said members together and in superimposed relation operating independent of each of the belt ends and their affixing means.

In testimony whereof I have signed my name to this specification in the presence of two subscribing witnesses.

LAWRENCE E. BAER.

Witnesses:
J. CARLTON BAGNALL,
JOHN J. HODGE.